US006857688B2

United States Patent
Morrison et al.

(10) Patent No.: US 6,857,688 B2
(45) Date of Patent: Feb. 22, 2005

(54) INTEGRATED DOOR MODULE

(75) Inventors: Gerald O. Morrison, Beverly Hills, MI (US); Terrence D. Gibney, Jr., Livonia, MI (US); Michael J. Berta, Rochester Hills, MI (US); Holger Reusswig, Dietzenbach (DE); Brian P. Skarb, Warren, MI (US)

(73) Assignee: Lear Corporation, Southfield, MI (US)

( * ) Notice: Subject to any disclaimer, the term of this patent is extended or adjusted under 35 U.S.C. 154(b) by 45 days.

(21) Appl. No.: 10/344,742

(22) PCT Filed: Oct. 31, 2001

(86) PCT No.: PCT/US01/45628

§ 371 (c)(1),
(2), (4) Date: Feb. 14, 2003

(87) PCT Pub. No.: WO03/037669

PCT Pub. Date: May 8, 2003

(65) Prior Publication Data

US 2004/0012226 A1 Jan. 22, 2004

(51) Int. Cl.$^7$ .................................................. B60J 5/00
(52) U.S. Cl. ............................... 296/146.7; 296/146.6; 296/193.03; 49/502
(58) Field of Search .................. 296/146.7, 193.03, 296/193.04, 146.6; 49/502, 352, 425, 130; 232/17; 264/45.4, 46.4

(56) References Cited

U.S. PATENT DOCUMENTS

| 4,882,842 | A | * | 11/1989 | Basson et al. | ............ 296/146.7 |
| 4,904,511 | A | * | 2/1990 | Barberis | ...................... 428/133 |
| 4,923,542 | A | * | 5/1990 | Janicki et al. | ............ 296/146.7 |
| 5,095,659 | A | * | 3/1992 | Benoit et al. | ............ 296/146.7 |
| 5,226,259 | A | * | 7/1993 | Yamagata et al. | ............ 49/502 |
| 5,584,144 | A | * | 12/1996 | Hisano | ..................... 296/146.7 |
| 5,820,191 | A | * | 10/1998 | Blakewood et al. | ..... 296/146.7 |
| 5,857,732 | A | * | 1/1999 | Ritchie | .................... 296/146.6 |
| 5,902,004 | A | * | 5/1999 | Waltz et al. | ............. 296/146.9 |
| 5,904,002 | A | * | 5/1999 | Emerling et al. | ............. 49/502 |
| 6,019,418 | A | * | 2/2000 | Emerling et al. | ......... 296/146.7 |
| 6,139,088 | A | * | 10/2000 | Okamoto et al. | ......... 296/146.7 |

(List continued on next page.)

FOREIGN PATENT DOCUMENTS

| DE | 198 27 362 | 12/1999 |
| DE | 199 37 000 A1 | 2/2001 |
| DE | 199 44 965 A1 | 3/2001 |
| EP | 1 129 873 A2 | 9/2001 |
| EP | 1 138 535 A2 | 10/2001 |
| WO | WO 00 53 446 | 9/2000 |
| WO | WO 00 53 457 | 9/2000 |

*Primary Examiner*—Kiran Patel
(74) *Attorney, Agent, or Firm*—Bill C. Panagos

(57) ABSTRACT

A door assembly includes a carrier panel attachable to a vehicle door outer structure such that the carrier panel substantially covers an opening of the door outer structure. The carrier panel is configured to function as a water shield between the door outer structure and a vehicle occupant compartment. The carrier panel also includes an upper portion and a lower portion, and the lower portion defines a lower appearance surface. The assembly further includes a hardware component mounted to and supported by the carrier panel, and an upper trim panel arrangement that is attachable to the carrier panel after the carrier panel has been attached to the door outer structure. The upper trim panel arrangement is configured to substantially cover the upper portion of the carrier panel and defines an upper appearance surface.

18 Claims, 4 Drawing Sheets

U.S. PATENT DOCUMENTS

| | | | |
|---|---|---|---|
| 6,185,872 B1 * | 2/2001 | Seeberger et al. ............. | 49/502 |
| 6,210,613 B1 | 4/2001 | Stein et al. | |
| 6,367,202 B1 * | 4/2002 | Reed et al. .................... | 49/502 |
| 6,412,852 B1 * | 7/2002 | Koa et al. ................ | 296/146.7 |
| 6,438,899 B1 * | 8/2002 | Feder et al. ............. | 296/146.7 |
| 6,493,919 B2 * | 12/2002 | Morrison et al. ............. | 29/434 |
| 6,536,164 B1 * | 3/2003 | Kirejczyk .................... | 49/502 |
| 6,536,825 B2 * | 3/2003 | McAndrew et al. ..... | 296/146.7 |
| 6,571,515 B1 * | 6/2003 | Samways et al. ............. | 49/502 |
| 6,615,546 B2 * | 9/2003 | Furuyama et al. ........ | 296/146.7 |

\* cited by examiner

INTEGRATED DOOR MODULE

BACKGROUND OF THE INVENTION

1. Field of the Invention

The invention relates to a door assembly for use with a motor vehicle having a door outer structure and an interior occupant compartment.

2. Background Art

Various door assemblies have been developed for use with motor vehicles. Such door assemblies are configured to be mounted onto a vehicle door outer structure, which may include an outer panel and an inner panel or frame. Examples of prior door assemblies are disclosed in U.S. Pat. Nos. 4,648,208, 4,882,842 and 5,095,659.

Another prior door assembly includes a carrier panel made of foamed polypropylene and a trim panel made of injection molded polypropylene. The carrier panel is attachable to a door outer structure of a vehicle, and the trim panel is attachable to the carrier panel with fasteners, after the carrier panel has been attached to the door outer structure. Furthermore, the trim panel defines the entire appearance surface of the door assembly.

SUMMARY OF THE INVENTION

Under the invention, a door assembly is provided for use with a motor vehicle having a door outer structure and an interior occupant compartment, wherein the door outer structure has an opening. The assembly includes a carrier panel adapted to be attached to the door outer structure such that the carrier panel substantially covers the opening. The carrier panel has a first side adapted to face toward the interior compartment and a second side adapted to face the door outer structure. Furthermore, the carrier panel is configured to function as a water shield between the door outer structure and the occupant compartment for inhibiting water from passing from the second side to the first side. The carrier panel also includes an upper portion and a lower portion. The lower portion defines a lower, finished appearance surface that is adapted to face the occupant compartment. The assembly further includes a vehicle door hardware component mounted to and supported by the carrier panel, and an upper trim panel that is attachable to the carrier panel after the carrier panel has been attached to the door outer structure. The upper trim panel is configured to substantially cover the upper portion of the carrier panel and having an upper, finished appearance surface that is adapted to face the occupant compartment.

DETAILED DESCRIPTION OF THE PREFERRED EMBODIMENT(S)

Figure 1:
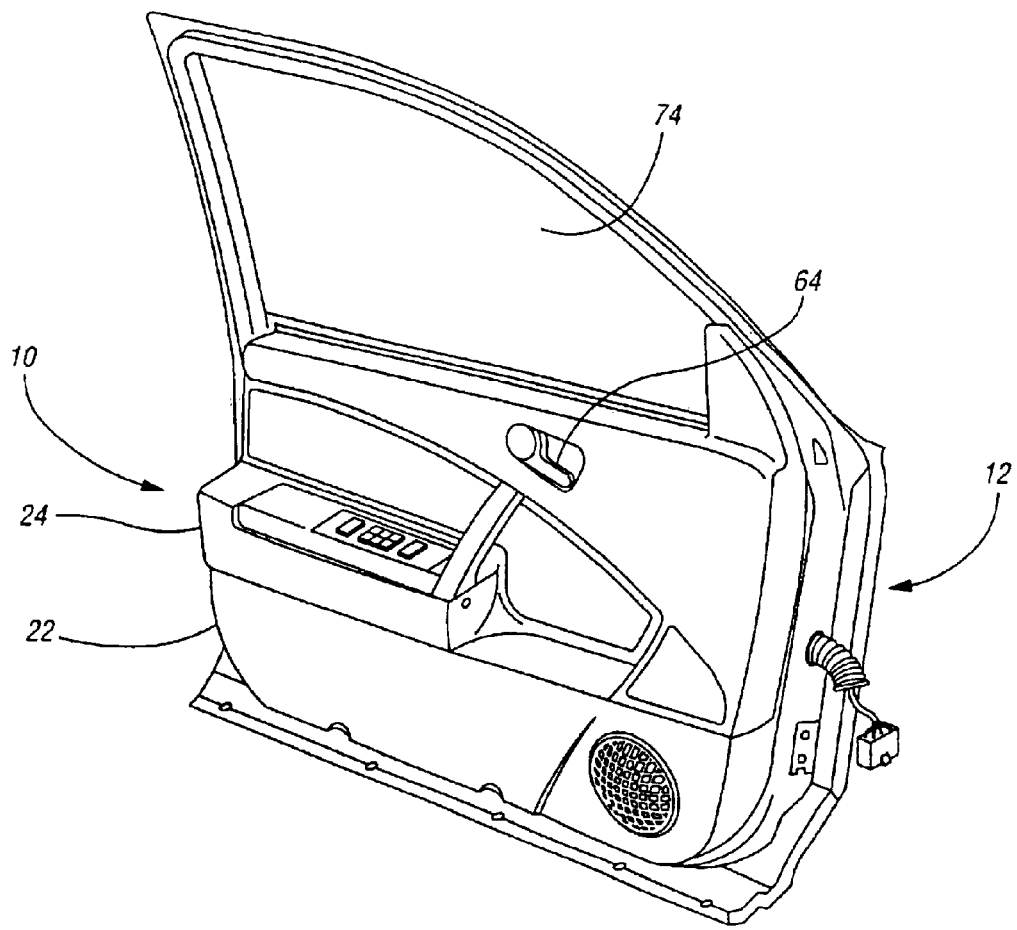
FIG. 1 is a perspective view of a door assembly according to the invention mounted to a door outer structure.
Figure 2:
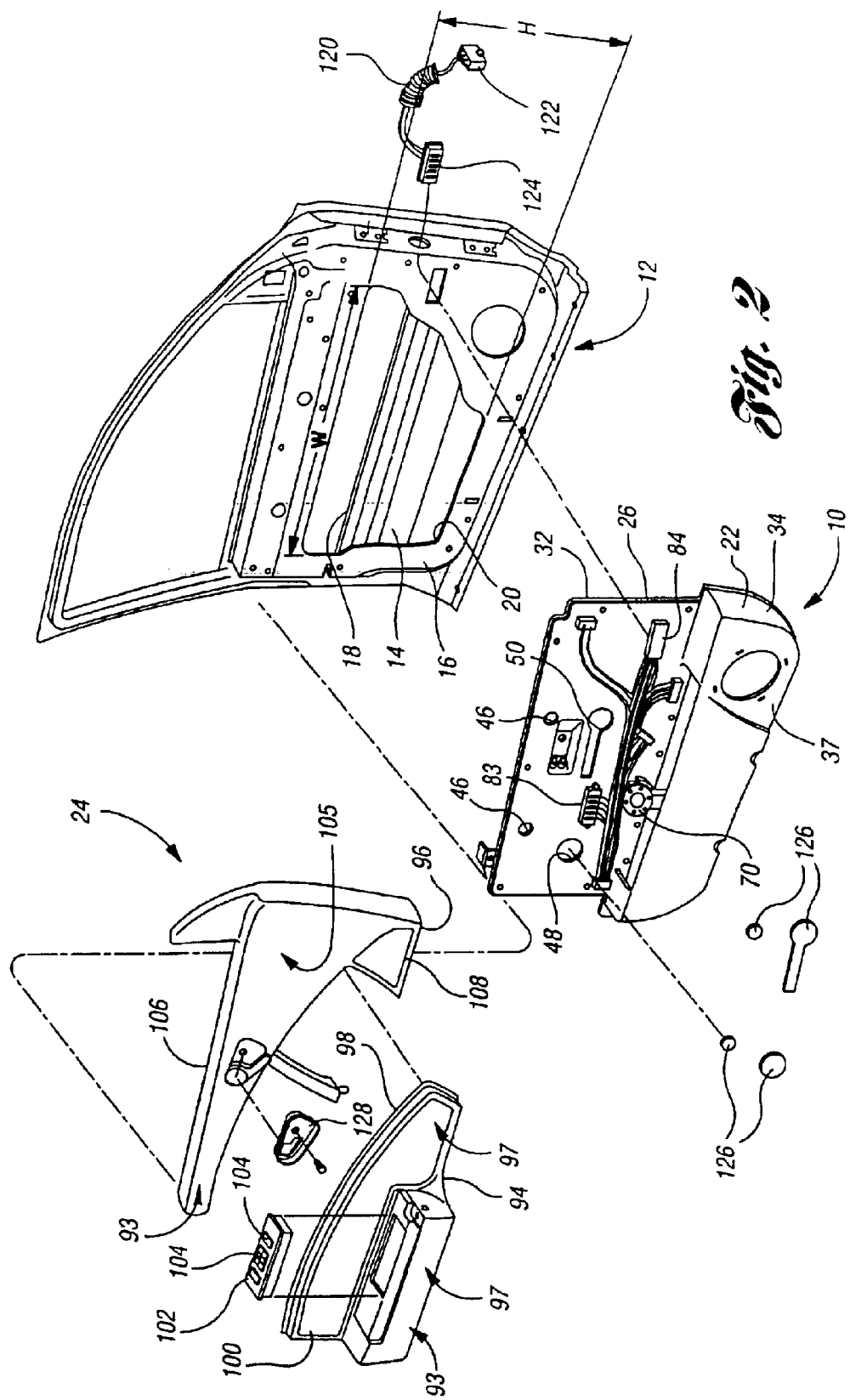
FIG. 2 is a partially exploded view of the door assembly, which includes a carrier module that is attachable to the door outer structure, and an upper trim panel arrangement that is attachable to the carrier module and/or door outer structure.

FIGS. 1 and 2 show a door assembly 10 according to the invention for use with a vehicle having a door outer structure 12 and an interior occupant compartment. The door outer structure 12 may be a metallic structure and includes an outer panel 14 and an inner panel 16 attached to the outer panel 14. The door outer structure 12 may also include a reinforcing member, such as lateral support 18, attached to the outer panel 14 and/or inner panel 16. Furthermore, the inner panel 16 has an opening 20 for receiving the door assembly 10, and the opening 20 has a maximum height h and a maximum width w.

Figure 3:
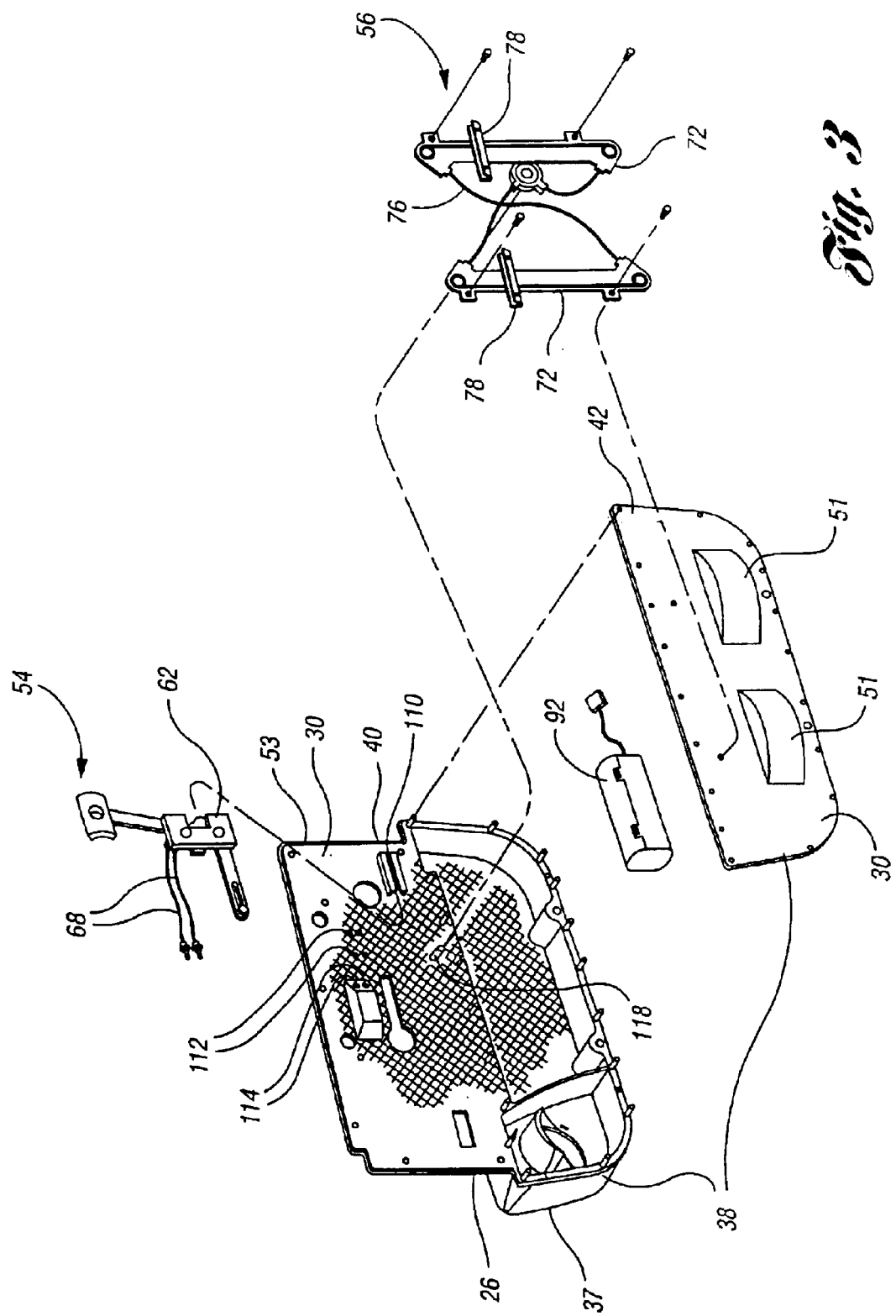
FIG. 3 is a rear exploded view of the carrier module.
Figure 4:
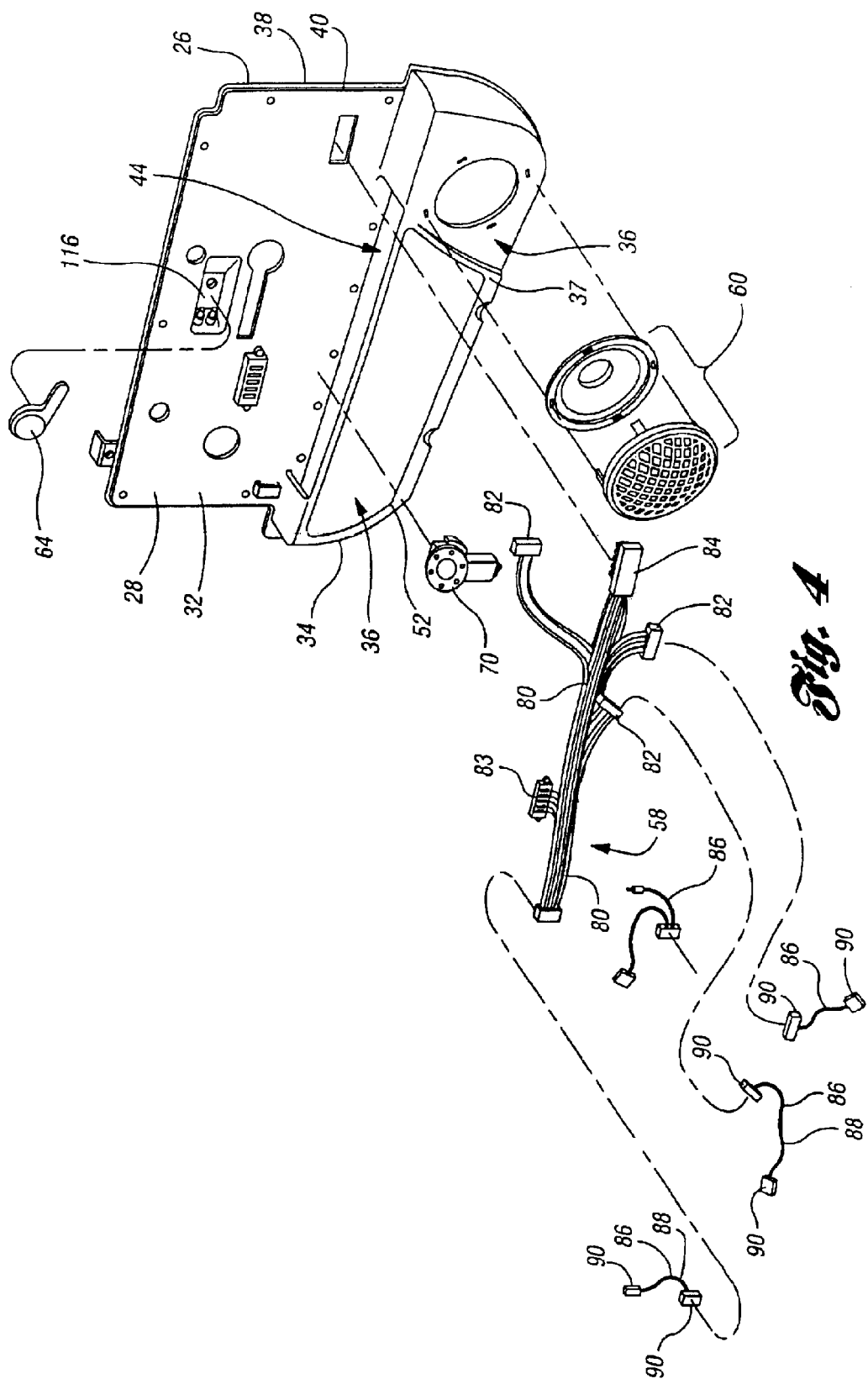
FIG. 4 is a front exploded view of the carrier module.

The door assembly 10 includes an integrated door module or carrier module 22 that is attachable to the door outer structure 12, and an upper trim panel arrangement 24 that is attachable to the carrier module 22 and/or door outer structure 12. Referring to FIGS. 2–4, the carrier module 22 includes a carrier panel 26 that is adapted to be attached to the door outer structure 12 such that the carrier panel 26 substantially covers the opening 20. In other words, the carrier panel 26 is adapted to span the height h and width w of the opening 20. The carrier panel 26 has a first side 28 adapted to face toward the interior compartment, and a second side 30 adapted to face the door outer structure 12. In addition, the carrier panel 26 is configured to function as a water shield between the interior compartment and the door outer structure 12 for inhibiting water from passing from the second side 30 to the first side 28. The carrier panel 26 further includes an upper portion 32 and a lower portion 34, and the lower portion 34 defines a lower, finished appearance surface 36. The lower appearance surface 36 may comprise approximate 20 to 40 percent, for example, of the entire appearance surface of the door assembly 10. As shown in FIGS. 2 and 4, the lower portion 34 may also include a projecting section or projection 37 that extends inwardly beyond the upper portion 32.

Still referring to FIGS. 2–4, the carrier panel 26 includes a carrier panel body 38 that is adapted to span the height h and width w of the opening 20. The carrier panel body 38 may include a main portion 40 and a lower back portion 42 that is attached to the main portion 40 so as to define a map pocket 44. With this configuration, the main portion 40 defines the upper portion 32, including the first and second sides 28 and 30, respectively, of the upper portion 32. The main portion 40 also defines the projection 37 of the lower portion 34. Furthermore, the back portion 42 defines the remainder of the lower portion 34, including the first and second sides 28 and 30, respectively, of the lower portion 34. Alternatively, the carrier panel body 38 may be formed as a single piece, or multiple pieces that are attached together. The carrier panel body 38 may also include one or more access apertures, such as holes 46 and 48 and slot 50, for providing access to components of the door assembly 10 and/or door outer structure 12, as explained below in greater detail.

The carrier panel body 38 may be made in any suitable manner and may comprise any suitable material or materials such that the carrier panel body 38 has sufficient strength to support, at least temporarily, one or more vehicle door hardware components, as explained below in greater detail. For example, the main portion 40 and/or the back portion 42 may be formed of injection molded or compression molded plastic, such as polypropylene. Furthermore, the plastic may be reinforced with natural and/or synthetic fibers or other particles. As another example, the main portion 40 and/or back portion 42 may be formed of foamed plastic material, such as foamed polypropylene, foamed polyethylene and foamed urethane. Such foamed plastic material is formed with a resin rich exterior surface and a foam interior. Other suitable materials for the carrier panel body 38 include acrylanitrile butadiene styrene (ABS) and glass-fiber mat reinforced thermoplastic material (GMT).

In the embodiment shown in FIG. 3, the main portion 40 is made of a structural, moisture impermeable material, such as one or more of the materials described above, and the back portion 42 is made of a flexible, moisture impermeable material such as expanded polypropylene. With such a configuration, the back portion 42 may also include one or more integrally formed energy management members, such as impact blocks 51.

The carrier panel body 38 may also define a portion or all of the lower appearance surface 36. For example, the lower appearance surface 36 may be provided as a painted surface or an integrally molded colored and/or grained surface of the main portion 40. Alternatively, the carrier panel 26 may include a cover material 52 that is attached to the carrier panel body 38 and that defines a portion or all of the appearance surface 36. The cover material 52 may comprise any suitable material, such as vinyl, carpet, leather, etc.

The carrier panel 26 may also include a seal 53 disposed about an outer periphery of the carrier panel body 38. The seal 53 is adapted to mate with the inner panel 16 so as to seal the carrier panel 26 against the inner panel 26 when the carrier panel is mounted to the door outer structure 12.

The carrier module 22 further includes one or more vehicle hardware components mounted to the carrier panel 26. In the embodiment shown in FIGS. 3 and 4, for example, the carrier module 22 includes a door latch assembly 54, a window regulator or lift mechanism 56, a conductive assembly 58 and a speaker 60 mounted to the carrier panel 26. The door latch assembly 54 includes a door latch 62 mounted in any suitable manner on second side 30 of the carrier panel 26. The door latch assembly 54 further includes an interior handle mechanism 64 mounted on first side 28 of the carrier panel 26, and actuating cables or links 66 and 68 extending between and connected to door latch 62 and handle mechanism 64.

The window lift mechanism 56 includes a motor 70 mounted on the first side 28 or the second side 30 of the carrier panel 26, and a pair of window regulator arms 72 mounted on the second side 30 for supporting an associated door window 74 for vertical movement. The motor 70 and regulator arms 72 may be mounted to the carrier panel 26 in any suitable manner, such as with fasteners. Alternatively, the motor 70 may be attached to one of the regulator arms 72. In the embodiment shown in FIG. 3, each regulator arm 72 is fixedly mounted to the carrier panel 26 in a substantially vertical use position, such that the regulator arms 72 are unable to rotate with respect to the carrier panel 26. With such a configuration, the regulator arms 72 may be fully supported by the carrier panel 26 after the door assembly 10 has been fully assembled to the door outer structure 12. Alternatively, the regulator arms 72 may be pivotally mounted to the carrier panel 26 such that the regulator arms 72 may be rotated into use positions after the carrier panel 26 has been attached to the door outer structure 12. With such a configuration, the regulator arms 72 may also be attached to the inner panel 16 of the door outer structure 12 after the regulator arms 72 have been rotated into the use positions.

The window lift mechanism 56 also includes a cable 76 that extends along each regulator arm 72 between ends thereof, and between the regulator arms 72 in a crossing manner. The cable 76 has a pair of window connectors 78 respectively associated with the regulator arms 72 to provide connection to the door window 74. Each window connector 78 is movable along a respective regulator arm 72 to enable vertical movement of the door window 74.

Alternatively, the window lift mechanism 56 may have any suitable configuration and include any suitable components. For example, the window lift mechanism 56 may include only one regulator arm.

The conductive assembly 58 may be a wire harness that includes various conductive elements, such as wires 80, and associated electrical connectors 82, 83 and 84 for operating electrical components of the door assembly 10, such as door latch assembly 54, window lift mechanism 56, speaker 60, a vehicle seat control, a mirror control, etc. In the embodiment shown in FIG. 4, the electrical connectors 83 and 84 are configured to be self-docking, as explained below in greater detail. A plurality of jumper wires 86 may also be connected between the conductive assembly 58 and the electrical components. Each jumper wire 86 may include one or more wires 88 and associated electrical connectors 90.

The carrier module 22 may also include one or more additional vehicle door hardware components mounted to the carrier panel 26. For example, the carrier module 22 may include a side impact restraint, such as air bag 92, connected to the main portion 40 and/or back portion 42 and disposed between the main portion 40 and back portion 42. Additional details regarding components that may be attached to carrier panel 26 are disclosed in co-pending application Ser. No. 09/690,635, which is hereby incorporated by reference.

Referring to FIG. 2, the upper trim panel arrangement 24 is attachable to the carrier panel 26 and/or door outer structure 12 after the carrier panel 26 has been attached to the door outer structure 12. For example, the upper trim panel arrangement 24 may be snap fit and/or attached with fasteners to the carrier panel 26 and/or door outer structure 12. The upper trim panel arrangement 24 is configured to substantially cover the upper portion 32 of the carrier panel 26, and has an upper, finished appearance surface 93 that is adapted to face the interior compartment. Furthermore, the upper trim panel arrangement 24 may include multiple upper trim panel portions, such as arm bolster portion 94 and top portion 96 that are attachable together. Alternatively, the upper trim panel arrangement 24 may be provided as a single panel or module. In any case, the configuration and materials of the upper trim panel arrangement 24 may be varied from vehicle to vehicle so as to provide aesthetic flexibility and brand-identification flexibility.

The arm bolster portion 94 defines a first or lower surface portion 97 of the upper appearance surface 93, and may include a bolster portion body 98 and one or more cover materials, such as cover material 100, attached to the bolster portion body 98. The bolster portion body 98 may comprise any suitable material, such as one or more of the materials described above with respect to the carrier panel body 38. The cover material 100 may define some or all of the lower surface portion 97, and may comprise any suitable cover material, such as cloth, carpet, vinyl, leather, etc. Alternatively, the arm bolster portion 94 may be provided without a cover material attached to the bolster portion body 98. With such a configuration, the bolster portion body 98 defines the entire lower surface portion 97.

The arm bolster portion 94 may further include a control unit, such as a switch pack 102, attached to the bolster portion body 98 such as by a snap fit. The switch pack 102 may include controls or switches 104 for controlling various vehicle components, such as window lift mechanism 56, a power door lock mechanism, a vehicle seat, an automatic mirror, etc. The switch pack 102 may also include a self-docking connector that mates with the connector 83 of the connector assembly 58.

The top portion 96 defines a second or upper surface portion 105 of the upper appearance surface 93, and may include a top portion body 106 and one or more cover materials, such as cover material 108, attached to the top portion body 106. The top portion body 106 may comprise any suitable material, such as one or more of the materials described above with respect to the carrier panel body 38. Furthermore, the cover material 108 may define some or all of the upper surface portion 105, and may comprise, for example, cloth, carpet, vinyl, leather, or any other suitable cover material. Alternatively, the top portion 96 may be provided without a cover material attached to the top portion body 106. With such a configuration, the top portion body 106 defines the entire upper surface portion 105.

Referring to FIGS. 2–4, a method according to the invention of manufacturing door assembly 10 will now be described. As mentioned above the carrier panel body 38 may be made in any suitable manner and may comprise any suitable material. In one embodiment of the invention, the main portion 40 is made of foamed plastic material using a gas-injection molding process. Such a process may include, for example, injecting polypropylene or other suitable plastic material into a mold, and then injecting a gas, such as nitrogen, into the plastic material so as to create a foam interior portion surrounded by a resin rich surface. The resin rich surface forms a solid plastic shell or layer around the foam interior portion. With such a configuration, the foamed plastic material is strong yet light weight.

In one embodiment of the invention, the back portion 42 is formed of expanded polypropylene. The back portion 42 is then heat staked or otherwise attached to the main portion 40. The air bag 92 may also be attached to the main portion 40 and/or back portion 42, prior to attaching the back portion 42 to the main portion 40.

Next, the conductive assembly 58 may be attached to the first side 28 or second side 30 of the main portion 40 such as with adhesive and/or fasteners. The conductive assembly 58 may be a preassembled wire harness structure as described above, or the conductive assembly 58 may be integrated with the carrier panel 26. For example, the conductive assembly 58 may include a conductive element or trace pattern, such as a metal trace pattern, that may be attached to the main portion 40. A plasma layer may then be sprayed over the trace pattern so as to insulate the traces from each other as well as the surroundings. The connectors 82, 83 and 84 may then be connected to the trace pattern, and the jumper wires 86 may be connected to the connectors 82, 83 and 84.

Next, the door latch assembly 54 is attached to the carrier panel 26 For example, a projecting portion of the door latch 62 may be slid into a channel 110 integrally formed on the second side 30 of the main portion 40, and one or more fasteners may be used to secure the door latch 62 in a desired position. The actuating links 66 and 68 may be routed through integrally formed clamp features 112 of the main portion 40, and then into holes 114 of a handle receptacle 116 of the main portion 40. Seals associated with the actuating links 66 and 68 are then seated in the holes 114.

The regulator arms 72 and cable 76 of the window lift mechanism 56 may also be mounted to the second side 30 of the main portion 40 and/or back portion 42 of the carrier panel 26. If the regulator arms 72 are fixedly mounted to the carrier panel 26, then the access slot 50 may be eliminated from the carrier panel 26. If the regulator arms 72 are pivotally mounted to the carrier panel 26, then the access slot 50 may provide access to the regulator arms 72 after the carrier panel 26 has been mounted to the door outer structure 12. As mentioned above, the window lift mechanism 56 may be provided with only one regulator arm. With such a configuration, the window lift mechanism 56 may also include two glass guides (not shown) mounted to the carrier panel on opposite sides of the regulator arm.

Next, the motor 70 may be mounted on the first side 28 of the main portion 40 and/or back portion 42 such that the motor 70 is in driving relationship with the cable 76. For example, a rotatable shaft 118 may be positioned between the motor 70 and the cable 76.

The speaker 60 may also be mounted on the carrier panel 76. In addition, one or more of the jumper wires 86 may be used to connect the conductive assembly 58 to the speaker 60, as well as other electrical components such as the door latch 62 and motor 70.

The bolster portion body 98 of the arm bolster portion 94 may be manufactured in any suitable manner, such as by an injection molding process or compression molding process. Furthermore, the cover material 100, if used, may be molded with the bolster portion body 98, or subsequently attached to the formed bolster portion body 98. The switch pack 102 is then attached to the bolster portion body 98.

The top portion 96 may be manufactured in a similar manner as the arm bolster portion 94. Alternatively, as mentioned above, the upper trim panel arrangement 24 may be formed as a single panel, or any number of panels that are attachable together and/or to the carrier module 22.

Referring to FIGS. 1 and 2, a method of assembling the door assembly 10 to the door outer structure 12 will now be described. First, a connector arrangement 120 may be positioned in the door outer structure 12. The connector arrangement 120 is configured to electrically connect the conductive assembly 58 with vehicle body wiring, such as a body harness (not shown), and includes first and second connectors 122 and 124, respectively. The first connector 122 is attachable to the body harness (not shown), and the second connector 124, which may be a self-docking connector, is attachable to the conductive assembly 58.

Next, the carrier module 22 is positioned proximate the opening 20 of the door outer structure 12 so that the connector 84 is positioned proximate the second connector 124. The carrier module 22 is then attached to the door outer structure 12 such that such that the connector 84 mates with the second connector 124, and such that the carrier panel 26 substantially covers the opening 20.

If the carrier module 22 includes one or more regulator arms 72 that are pivotally connected to the carrier panel 26, the method may also include inserting a tool, such as a screwdriver, through the slot 50 after the carrier panel 26 has been attached to the door outer structure 12. The tool may then be used to rotate the regulator arms 72 with respect to the carrier panel 26 and into substantially vertical use positions. Next, the regulator arms 72 may be secured to the inner panel 16 with fasteners.

The holes 46 and 48 and slot 50, as well as any other apertures in the carrier panel body 38, may then be covered with patches 126. The patches 126 may comprise any suitable material, such as closed-cell foam, and may be attached to the carrier panel body 38 in any suitable manner, such as with adhesive.

Next, the arm bolster portion 94 is attached against the upper portion 32 such that the self docking connector of the switch pack 102 mates with the connector 83 of the conductive assembly 58. The top portion 96 is then positioned above the arm bolster portion 94 and attached against the upper portion 32, such that the arm bolster portion 94 and top portion 96 cooperate to substantially cover the first side 28 of the upper portion 32. The arm bolster portion 94 and top portion 96 also cooperate to define the upper appearance surface 93. A door handle bezel 128 may then be positioned around the door handle 67.

Under the invention, a common carrier module may be used for a variety of vehicles. Advantageously, different upper appearance surfaces and brand identifications may be achieved by using different upper trim panel arrangements. Furthermore, an upper trim panel arrangement, or portion thereof, may be replaced if damaged.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A door assembly for use with a motor vehicle having a door outer structure and an interior occupant compartment, wherein the door outer structure has an opening for receiving the door assembly, the assembly comprising:

a carrier panel adapted to be attached to the door outer structure such that the carrier panel substantially covers the opening, the carrier panel having a first side adapted to face toward the occupant compartment and a second side adapted to face the door outer structure, the carrier panel being configured to function as a water shield between the door outer structure and the occupant compartment for inhibiting water from passing from the second side to the first side, the carrier panel further including an upper portion and a lower portion, the lower portion defining a lower, finished appearance surface that is adapted to face the occupant compartment;

a vehicle door hardware component mounted to and supported by the carrier panel; and an upper trim panel arrangement that is attachable to the carrier panel after the carrier panel has been attached to the door outer structure, the upper trim panel arrangement being configured to substantially cover the upper portion of the carrier panel and having an upper, finished appearance surface that is adapted to face the occupant compartment.

2. The door assembly of claim 1 wherein the carrier panel includes a carrier panel body and a cover material attached to the carrier panel body, the cover material defining the lower, finished appearance surface.

3. The door assembly of claim 1 wherein the opening has a height and a width, and the carrier panel includes a carrier panel body that is adapted to span the height and the width of the opening.

4. The door assembly of claim 3 wherein the carrier panel body defines the lower, finished appearance surface.

5. The door assembly of claim 3 wherein the carrier panel body comprises plastic.

6. The door assembly of claim 3 wherein the carrier panel body comprises polypropylene.

7. The door assembly of claim 3 wherein the carrier panel body comprises foamed plastic material.

8. The door assembly of claim 3 wherein the carrier panel body comprises thermoplastic material reinforced with fiberglass.

9. The door assembly of claim 3 wherein the carrier panel body includes an access slot configured to receive a positioning tool that is used to position the vehicle door hardware component relative to the carrier panel body after the carrier panel has been attached to the door outer structure.

10. The door assembly of claim 9 wherein the carrier panel includes a sealer patch that is attachable to the carrier panel body for covering the access slot after the vehicle door hardware component has been positioned.

11. The door assembly of claim 3 wherein the carrier panel body includes a main portion and a back portion attached to the main portion, wherein the main portion and the back portion cooperate to define a map pocket.

12. The door assembly of claim 1 further comprising multiple vehicle door hardware components mounted to and supported by the carrier panel, the components including a door latch mechanism and a window regulator mechanism, the door latch mechanism including an inner door handle mounted on the first side of the carrier member, and a latch assembly connected to the door handle and mounted on the second side of the carrier member, the window regulator mechanism including a motor mounted on the first side of the carrier member, and a window regulator arm mounted on the second side of the carrier member.

13. The door assembly of claim 1 wherein the vehicle door hardware component is a window regulator mechanism that includes a pair of window regulator arms fixedly attached to and fully supported by the carrier panel, such that the window regulator arms are not directly attachable to the door outer structure.

14. A method for making a vehicle door for use with a vehicle having an interior occupant compartment, the method comprising:

positioning a carrier module proximate a vehicle door outer structure having an opening, the carrier module including a carrier panel and a vehicle door hardware component attached to the carrier panel, the carrier panel including first and second sides and upper and lower portions, the lower portion having a lower, finished appearance surface for facing the occupant compartment;

attaching the carrier panel to the door outer structure such that the carrier panel substantially covers the opening; and securing an upper trim panel arrangement against the carrier panel after the carrier panel has been attached to the door outer structure such that the upper trim panel arrangement substantially covers the first side of the upper portion, the upper trim panel arrangement having an upper, finished appearance surface for facing the occupant compartment;

wherein the carrier panel is configured to function as a water shield for inhibiting water from passing from the second side to the first side of the carrier panel.

15. The method of claim 14 wherein the carrier panel includes a carrier panel body having an access aperture, and wherein the method further comprises inserting a tool through the access aperture, after the carrier panel has been attached to the door outer structure, and positioning the vehicle door hardware component relative to the carrier panel using the tool.

16. The method of claim 15 further comprising attaching an access patch to the carrier panel body, after the vehicle door hardware component has been positioned, so as to cover the access aperture.

17. The method of claim 14 wherein the vehicle door hardware component is a window regulator mechanism that includes two window regulator arms fixedly attached to the carrier panel such that each regulator arm is in a use position with respect to the carrier panel prior to the positioning step, and wherein the step of attaching the carrier panel to the door outer structure is performed such that the window regulator arms remain in the use positions.

18. A method for making a vehicle door for use with a vehicle having an interior occupant compartment, the method comprising:

forming a carrier panel body from plastic material, the carrier panel body having first and second sides and upper and lower portions, the upper portion having an access aperture extending therethrough, the lower portion having a lower, finished appearance surface for facing the occupant compartment;

mounting a window regulator arm to the carrier panel body;

attaching the carrier panel body to a vehicle door outer structure having an opening such that the carrier panel body substantially covers the opening, inserting a tool through the access aperture after the carrier panel body has been attached to the door outer structure;

rotating the window regulator arm with respect to the carrier panel body using the tool;

securing the window regulator arm to the door outer structure;

attaching a sealing patch to the carrier panel body so as to cover the access aperture; and securing an upper trim panel arrangement against the carrier panel after the window lift guide has been attached to the door outer structure such that the upper trim panel arrangement substantially covers the first side of the upper portion, the upper trim panel arrangement having an upper, finished appearance surface for facing the occupant compartment;

wherein the carrier panel body is configured to function as a water shield for inhibiting water from passing from the second side to the first side of the carrier panel body.

* * * * *